US011643028B2

(12) United States Patent
Pasquali et al.

(10) Patent No.: US 11,643,028 B2
(45) Date of Patent: May 9, 2023

(54) FIXING BRACKET, COMBINATION, ARRANGEMENT, AND METHOD OF MANUFACTURING A FIXING BRACKET

(71) Applicant: Vitesco Technologies GmbH, Hannover (DE)

(72) Inventors: Marco Pasquali, Munich (DE); Andrea Puccini, Munich (DE)

(73) Assignee: VITESCO TECHNOLOGIES GMBH, Hanover (DE)

( * ) Notice: Subject to any disclaimer, the term of this patent is extended or adjusted under 35 U.S.C. 154(b) by 308 days.

(21) Appl. No.: 16/954,731

(22) PCT Filed: Dec. 11, 2018

(86) PCT No.: PCT/EP2018/084389
§ 371 (c)(1),
(2) Date: Jun. 17, 2020

(87) PCT Pub. No.: WO2019/121172
PCT Pub. Date: Jun. 27, 2019

(65) Prior Publication Data
US 2021/0162938 A1 Jun. 3, 2021

(30) Foreign Application Priority Data
Dec. 19, 2017 (EP) .................................... 17208500

(51) Int. Cl.
*B60R 16/02* (2006.01)
*H02G 3/04* (2006.01)
(Continued)

(52) U.S. Cl.
CPC ....... *B60R 16/0215* (2013.01); *H02G 3/0456* (2013.01); *F02M 51/005* (2013.01); *F02M 55/025* (2013.01)

(58) Field of Classification Search
CPC combination set(s) only.
See application file for complete search history.

(56) References Cited

U.S. PATENT DOCUMENTS 3,747,166 A * 7/1973 Eross ........................ F16L 3/24
403/188
4,572,145 A * 2/1986 Mitchell ............. F02M 27/045
123/538
(Continued)

FOREIGN PATENT DOCUMENTS

CN 104271937 A 1/2015 ............. F02M 61/14
DE 10 2010 014 497 10/2011 ............. F02M 55/02
(Continued)

OTHER PUBLICATIONS

Search Report for International Application No. PCT/EP2018/084389, 11 pages, dated Feb. 25, 2019.
(Continued)

*Primary Examiner* — Monica E Millner
(74) *Attorney, Agent, or Firm* — Slayden Grubert Beard PLLC

(57) ABSTRACT

Various embodiments of the teachings here include a fixing bracket for fixing a tie wrap at a fuel rail for mounting a wiring harness at the fuel rail, the fixing bracket comprising: a one-piece bracket body extending along a longitudinal direction, the bracket body including a first longitudinal end section, a second longitudinal end section, and an intermediate section. The intermediate section is disposed between the first end section and the second end section. The intermediate section comprises a protrusion including two bows spaced apart from one other by a slot disposed between the bows.

10 Claims, 11 Drawing Sheets

(51) Int. Cl.
*F02M 51/00* (2006.01)
*F02M 55/02* (2006.01)

(56) References Cited

U.S. PATENT DOCUMENTS

| | | | | |
|---|---|---|---|---|
| 5,121,894 | A * | 6/1992 | Twork, Sr. | F16L 3/13 248/74.2 |
| 5,597,980 | A | 1/1997 | Weber | 174/72 A |
| 5,704,232 | A * | 1/1998 | Kuo | E05B 67/38 248/229.1 |
| 5,806,813 | A * | 9/1998 | Binelli | F16B 2/08 24/20 TT |
| 5,839,703 | A * | 11/1998 | Tesar | F16L 3/13 248/65 |
| 5,921,520 | A | 7/1999 | Wisniewski | 248/316.1 |
| 6,334,242 | B1 * | 1/2002 | Scollard | F16L 3/13 248/74.2 |
| 6,364,257 | B1 * | 4/2002 | Holder | F16L 3/237 248/74.1 |
| 6,457,375 | B1 * | 10/2002 | Buch | B62D 3/12 180/428 |
| 6,584,949 | B1 * | 7/2003 | Franchi | F02F 7/006 123/195 A |
| 6,622,976 | B1 * | 9/2003 | Lanello | F16L 3/243 248/74.2 |
| 6,691,381 | B2 * | 2/2004 | Scollard | F02M 69/465 248/74.2 |
| 8,079,560 | B2 * | 12/2011 | Blackwell | B60R 11/00 403/53 |
| 8,336,834 | B2 * | 12/2012 | Matsumoto | F16L 33/03 248/62 |
| 8,505,962 | B2 * | 8/2013 | Henriksson | F16L 3/137 280/728.2 |
| 9,601,908 | B2 * | 3/2017 | Merritt | H02G 3/02 |
| 9,982,642 | B2 | 5/2018 | Matteini et al. | |
| 11,305,708 | B2 * | 4/2022 | Lindner | B60R 16/00 |
| 2012/0125663 | A1 * | 5/2012 | Mabuchi | H02G 3/32 174/135 |
| 2016/0121822 | A1 * | 5/2016 | Shaw | B60R 16/0215 248/74.3 |
| 2017/0292634 | A1 * | 10/2017 | Nguyen | F16L 3/02 |
| 2018/0058609 | A1 * | 3/2018 | Van Hulst | F16L 3/127 |

FOREIGN PATENT DOCUMENTS

| | | | |
|---|---|---|---|
| DE | 10 2014 108 163 | 12/2015 | ............. F02M 55/02 |
| FR | 2 978 621 | 7/2011 | ............. H02G 3/02 |

OTHER PUBLICATIONS

Search Report for EP Application No. 17208500.3, 5 pages, dated Jun. 13, 2018.
Chinese Office Action, Application No. 201880082557.0, 19 pages.

* cited by examiner

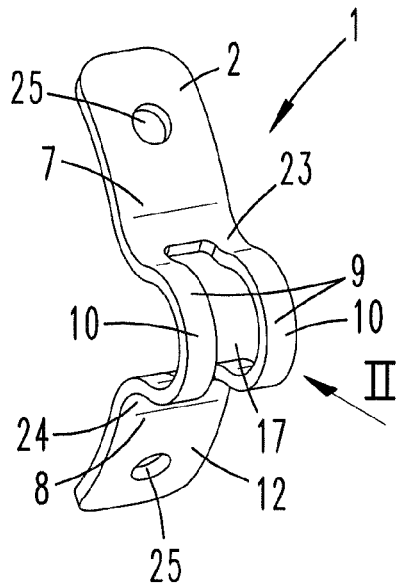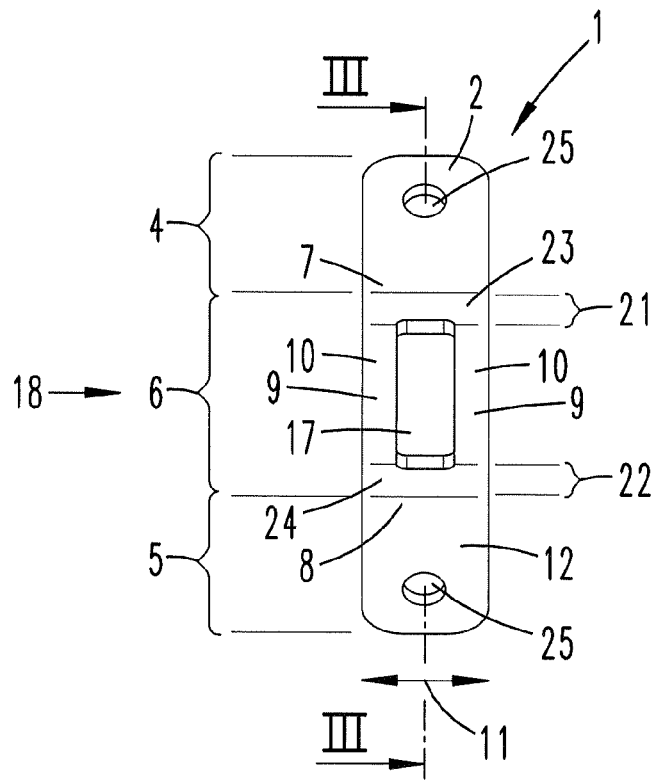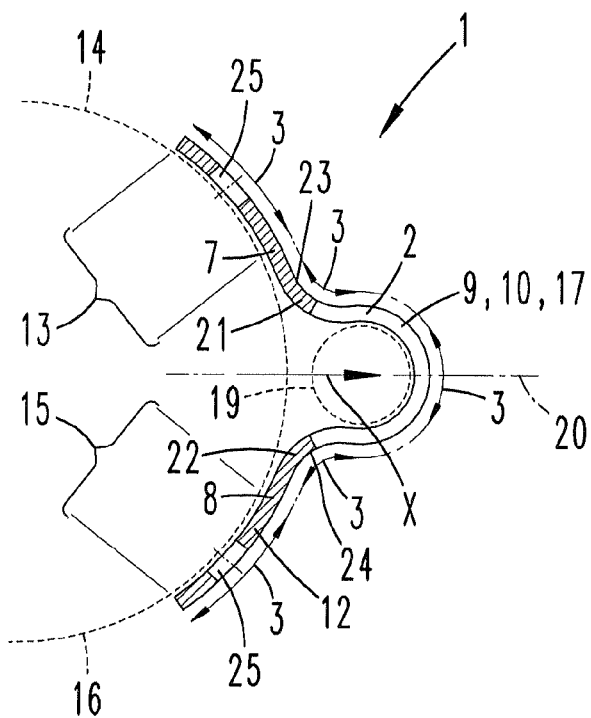

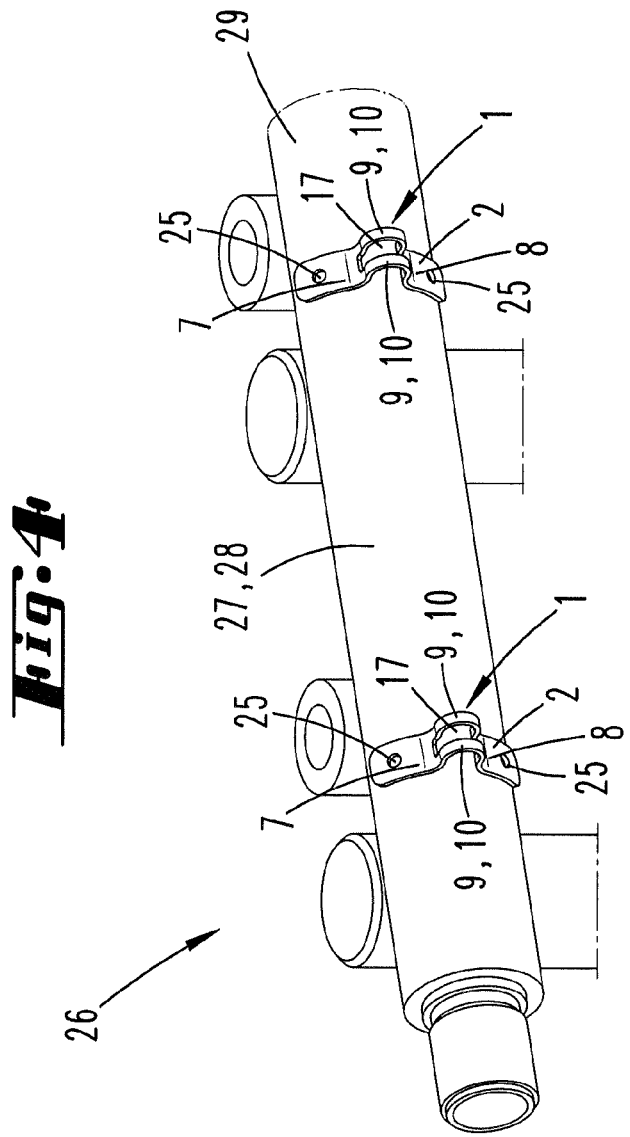

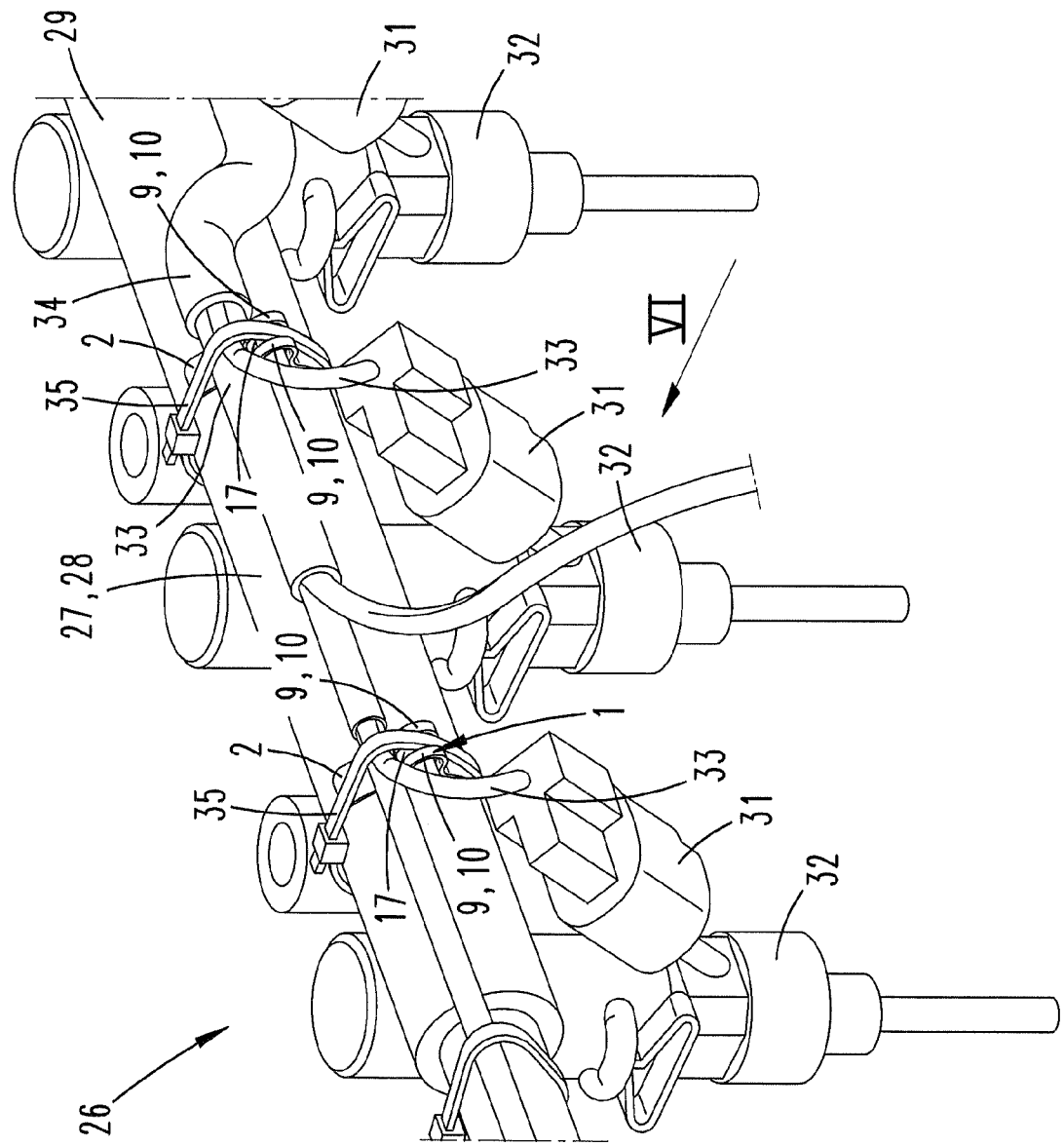

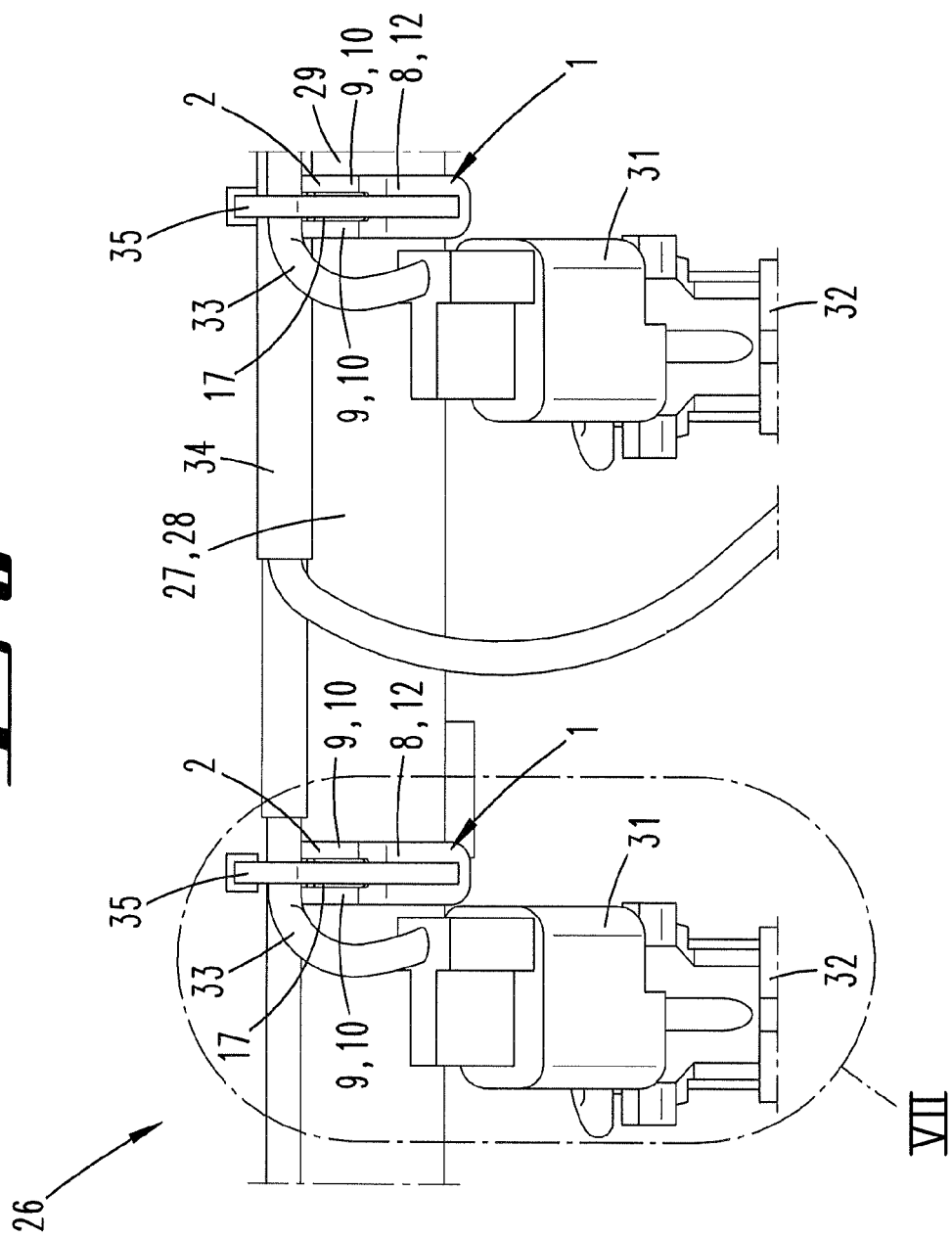

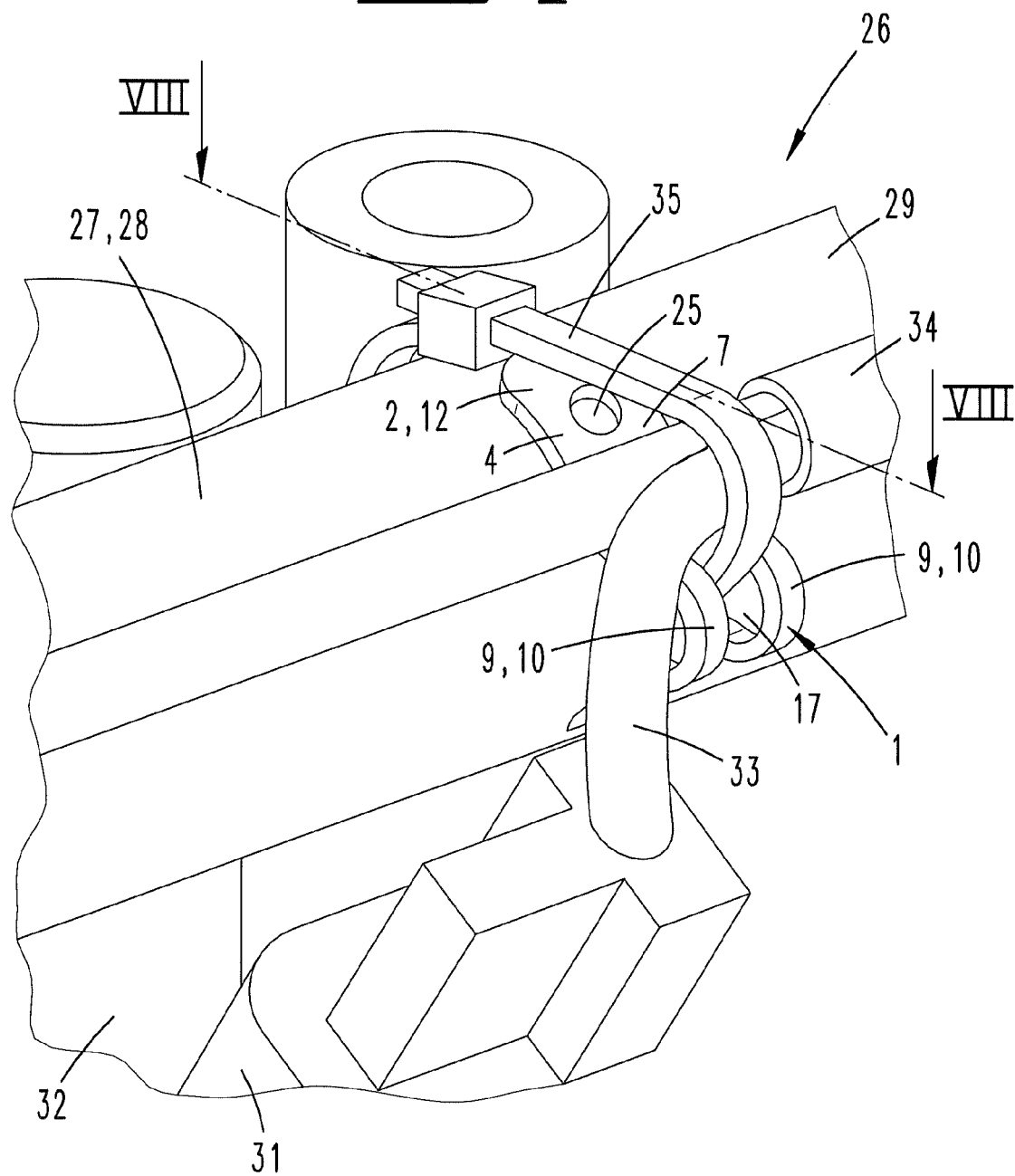

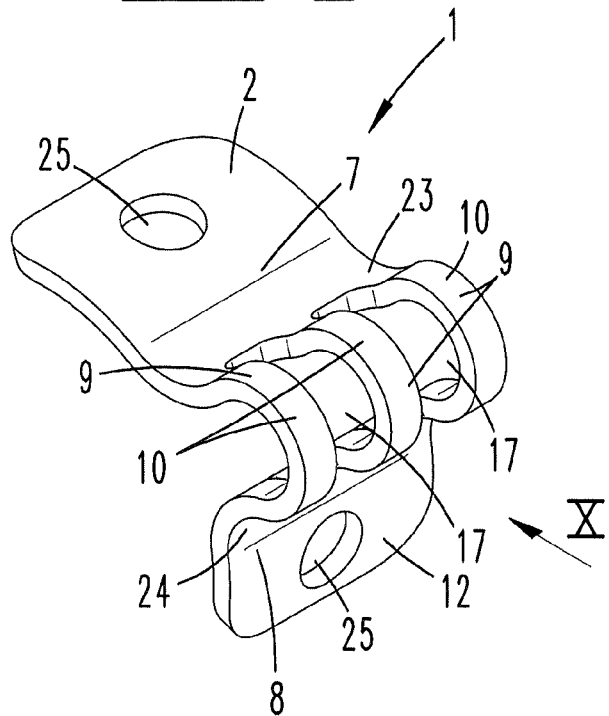
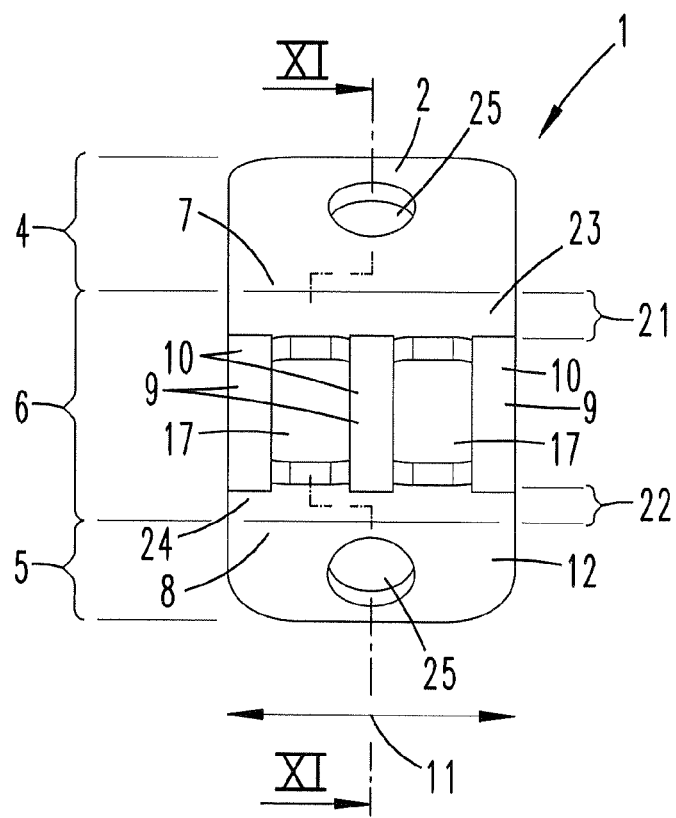

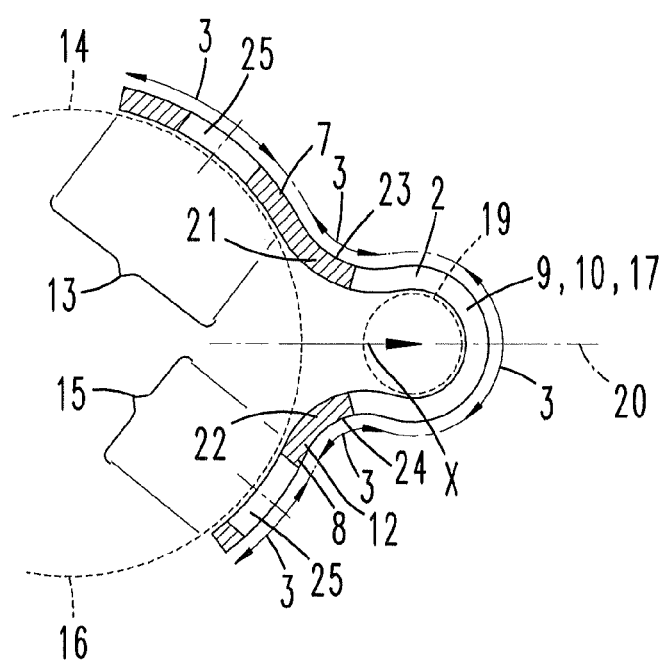

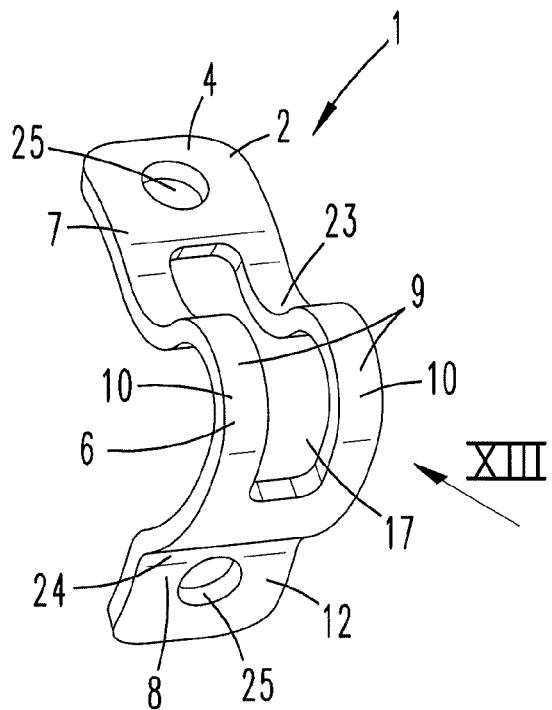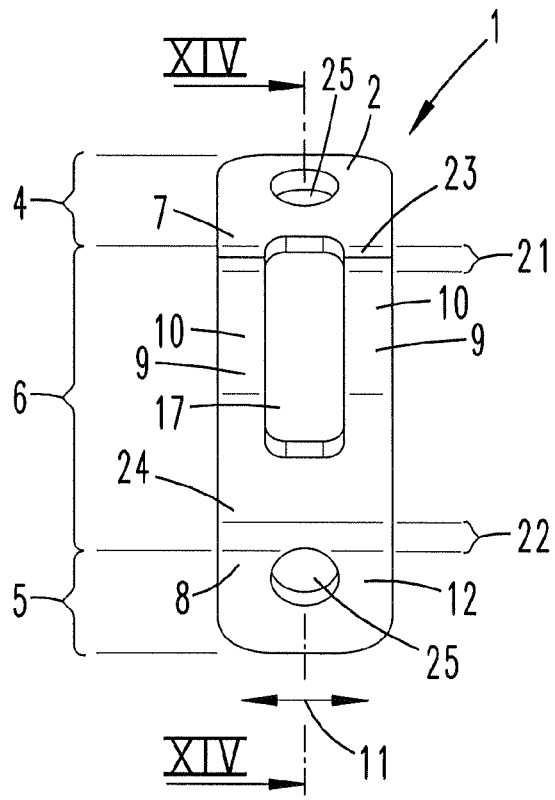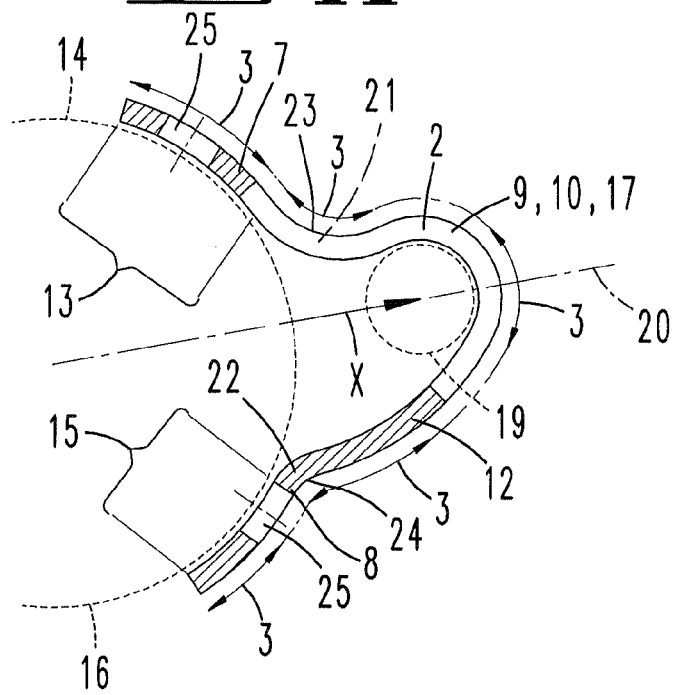

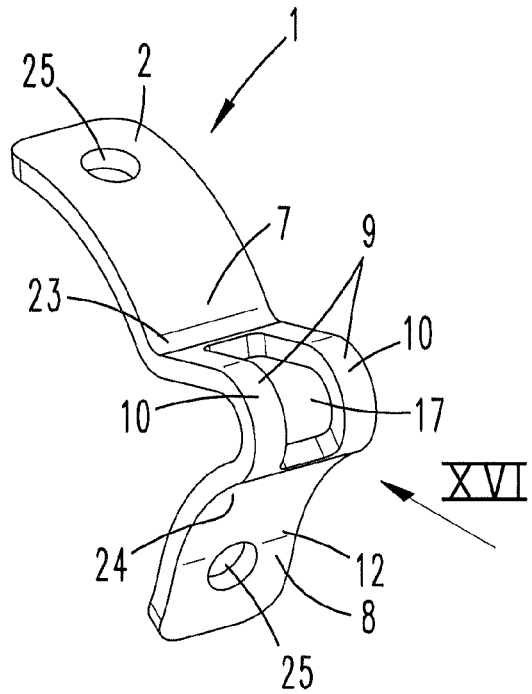
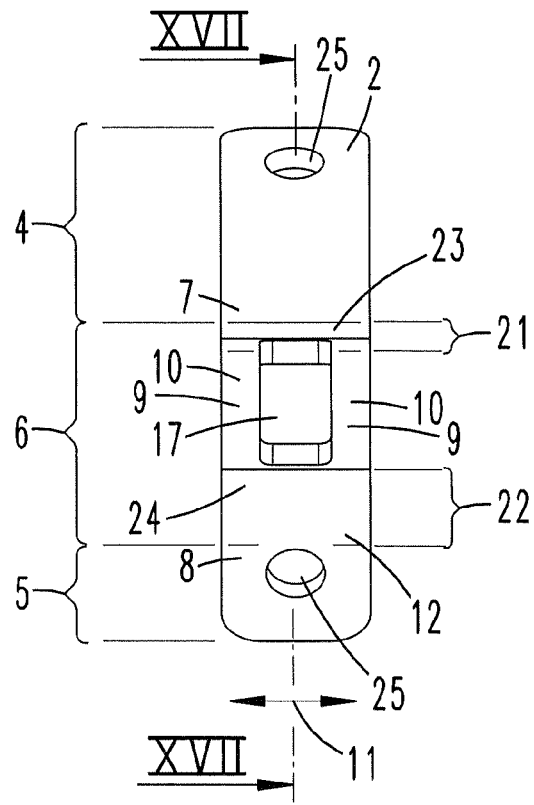
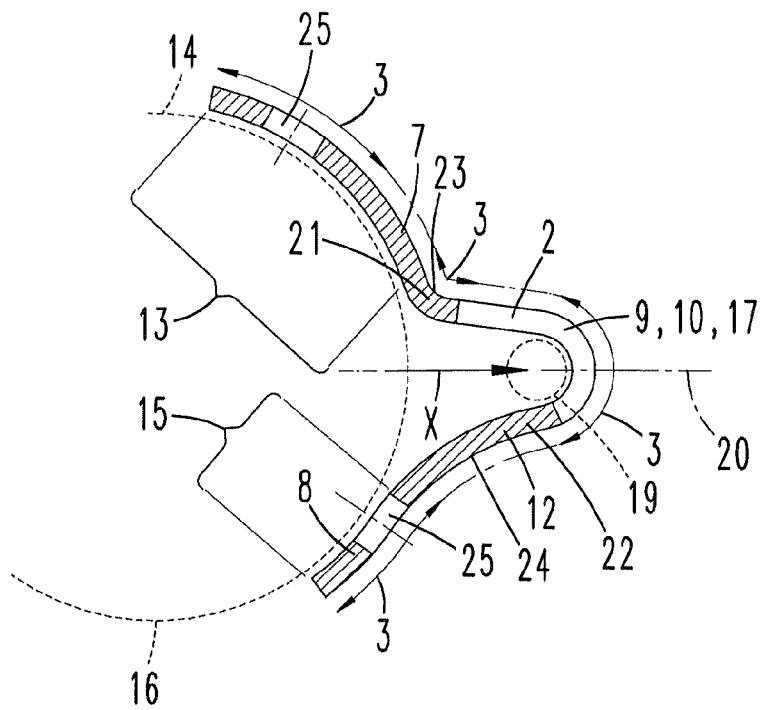

FIXING BRACKET, COMBINATION, ARRANGEMENT, AND METHOD OF MANUFACTURING A FIXING BRACKET

CROSS-REFERENCE TO RELATED APPLICATIONS

This application is a U.S. National Stage Application of International Application No. PCT/EP2018/084389 filed Dec. 11, 2018, which designates the United States of America, and claims priority to EP Application No. 17208500.3 filed Dec. 19, 2017, the contents of which are hereby incorporated by reference in their entirety.

TECHNICAL FIELD

The present disclosure relates to fixing brackets. Various embodiments of the teachings herein include brackets for fixing a tie wrap at a fuel rail for mounting a wiring harness at the fuel rail, combinations comprising a tubular component of a fuel rail, which in particular is a main gallery of a fuel rail, and one or more fixing brackets, methods of manufacturing for fixing brackets, and/or methods of manufacturing for an arrangement comprising a tie wrap, a wiring harness and a tubular component, which in particular is a main gallery of a fuel rail, and at least one fixing bracket.

BACKGROUND

For fixing a wiring harness to the main gallery of a fuel rail up to now tie wraps for fixing the wiring harness to the fuel rail are wrapped around the main gallery of the fuel rail. However, this solution does not provide a well-determined position of the tie wraps and of the wiring harness and is not error-proof because the tie wrap can be located in different positions. An also known alternative is to use fixation clips, but they need a dedicated bracket and a correspondent clip, leading to higher costs.

SUMMARY

As an example, some embodiments include a fixing bracket (1), in particular for fixing a tie wrap (35) at a fuel rail (29) for mounting a wiring harness (33) at the fuel rail (29), characterized in that the fixing bracket (1) comprises a one-piece bracket body (2) which extends along a longitudinal extending direction (3), that the bracket body (2) comprises a first longitudinal end section (4), a second longitudinal end section (5) and an intermediate section (6), wherein the intermediate section (6) with regard to the longitudinal extending direction (3) is formed between said first and second longitudinal end sections (4, 5), that the intermediate section (6) comprises a protrusion (9), wherein the protrusion (9) comprises at least two bows (10) which are spaced apart from each other by a slot (17), which is formed between the bows (10).

In some embodiments, the first longitudinal end section (4) comprises a portion (7) which is adjacent to the intermediate section (6), that the second longitudinal end section (5) comprises a portion (8) which is adjacent to the intermediate section (6), that the protrusion (9) extends along a direction (X) which is transversal or orthogonal with regard to a surface of said portion (7) of the first longitudinal end section (4) and/or which is transversal or orthogonal with regard to a surface of said portion (8) of the second longitudinal end section (5), and that the bows (10) are spaced apart from each other in a direction (11) which is perpendicular with regard to the longitudinal extending direction (3).

In some embodiments, the bracket body (2) is integrally made, in particular integrally made of a sheet (12) of metal, plastic or the like, in particular by cutting the sheet (12) to a lamellar or strip-like form before bending or folding it.

In some embodiments, the first longitudinal end section (4) at least in a part (13) of its longitudinal extension is curved to adapt to a first circular contour (14) and/or that the second longitudinal end section (5) at least in a part (15) of its longitudinal extension is curved to adapt to a second circular contour (16), wherein in particular the first circular contour (14) and the second circular contour (16) are the same and in particular overlap each other.

In some embodiments, the protrusion (9) comprises three or more bows (10) which are spaced apart from each other in a direction (11) which is perpendicular with regard to the longitudinal extending direction (3), wherein with regard to each pair of neighboring bows (10) both bows (10) of the respective pair adjoin a respective slot (17) between them.

In some embodiments, with regard to a view of the bracket body (2) being projected to a first geometrical projection plane the shape of the bows (10) at least in a section of their length is adapted to a third circular contour (19) having a radius smaller compared to a radius of the first circular contour (14) and compared to a radius of the second circular contour (16), or that with regard to a view of the bracket body (2) being projected to a first geometrical projection plane the shape of the bows (10) at least in a section of their length is adapted to a polygon.

In some embodiments, with regard to a view of the bracket body (2) being projected to a first geometrical projection plane the shape of the bows (10) at least in a section of their length is symmetrical or asymmetrical with regard to a geometrical center plane (20).

In some embodiments, the intermediate section (6) has a first portion (21) being adjacent to the first longitudinal end section (4) and has a second portion (22) being adjacent to the second longitudinal end section (5) and that said first portion (21) and/or said second portion (22) forms a respective resting plane (23, 24), wherein with regard to a view of the bracket body being projected to a first geometrical projection plane the resting plane (23, 24) or a section of the resting plane (23, 24) in particular has a concave shape.

In some embodiments, with regard to a view of the bracket body (2) being projected to a second geometrical projection plane the bows (10) extend straight and parallel to each other, wherein in particular the second geometrical projection plane extends perpendicular with regard to the first geometrical projection plane.

In some embodiments, the first longitudinal end section (4) comprises a via hole and/or that the second longitudinal end section (5) comprises a via hole (25).

As another example, some embodiments include a combination, comprising a tubular component (27) of a fuel rail (29), wherein the tubular component (27) in particular is a main gallery (28) of a fuel rail (29), and one or more fixing brackets, characterized in that one or more of the fixing brackets (1) are in accordance with descriptions herein.

In some embodiments, the main gallery (28) has an outer circular shape and that the radius of said outer circular shape and the radius of the first circular contour (14) and/or the radius of the second circular contour (16) correspond to each other, wherein the combination also comprises at least one tie wrap (35) and a wiring harness (33).

In some embodiments, the fixing bracket (1) is attached, in particular by welding or brazing, to the tubular component (27) of the fuel rail (29) so that the slot (17) extends along a part of the outer circumference of said tubular component (27), that the wiring harness (33) is supported by the resting plane (23, 24) of the fixing bracket (1) or by one of the resting planes (23, 24) of the fixing bracket (1) and that the tie wrap (35) is wrapped around the tubular component (27) of the fuel rail (29) and around the wiring harness and is fed through the slot (17) of the fixing bracket (1).

As another example, some embodiments include a method of manufacturing for a fixing bracket (1), characterized that the fixing bracket is a fixing bracket (1) as described herein and that the method comprises the following steps: providing a lamellar or strip-like sheet (12) of metal or plastic, forming a via hole (30) in a medium region of the sheet (12) by cutting and thereafter bending or folding the sheet (12) so that the protrusion (9) and in particular at least one concave resting plane (23, 24) is formed.

As another example, some embodiments include a method of manufacturing for an arrangement (26) comprising a tie wrap (35), a wiring harness (33), a tubular component (27) of a fuel rail (29), wherein the tubular component (27) in particular is a main gallery (28) of the fuel rail (29), and at least one fixing bracket, characterized in that the method comprises the following steps: providing a fixing bracket (1) as described herein, attaching the fixing bracket (1), in particular by welding or brazing, to the tubular component (27) of the fuel rail (29) so that the slot (17) of the fixing bracket (1) extends along a part of the outer circumference of said tubular component (27), supporting the wiring harness (33) by the resting plane (23) of the fixing bracket (1) or by one the resting planes (23, 24) of the fixing bracket (1) and wrapping the tie wrap (35) around the tubular component (27) of the fuel rail (29) and around the wiring harness (33) by feeding the tie wrap (35) through the slot (17) of the fixing bracket (1).

BRIEF DESCRIPTION OF THE DRAWINGS

In FIGS. 1-20 corresponding or similar elements appearing in different illustrations and with regard to different example embodiments are identified by the same reference numbers.

FIGS. 1-3 depict a first example embodiment of a fixing bracket 1 incorporating the teachings herein.

FIG. 4 depicts a first example embodiment of an arrangement 26 incorporating the teachings herein.

FIGS. 5-8 depict a second example embodiment of an arrangement 26 incorporating teachings of the present disclosure.

FIGS. 9-11 depict a second example embodiment of a fixing bracket 1 incorporating the teachings herein.

FIGS. 12-14 depict a third example embodiment of a fixing bracket 1 incorporating the teachings herein.

FIGS. 15-17 depict a fourth example embodiment of a fixing bracket 1 incorporating the teachings herein.

FIGS. 18-20 depict a fifth example embodiment of a fixing bracket 1 incorporating the teachings herein.

DETAILED DESCRIPTION

Figure 8:
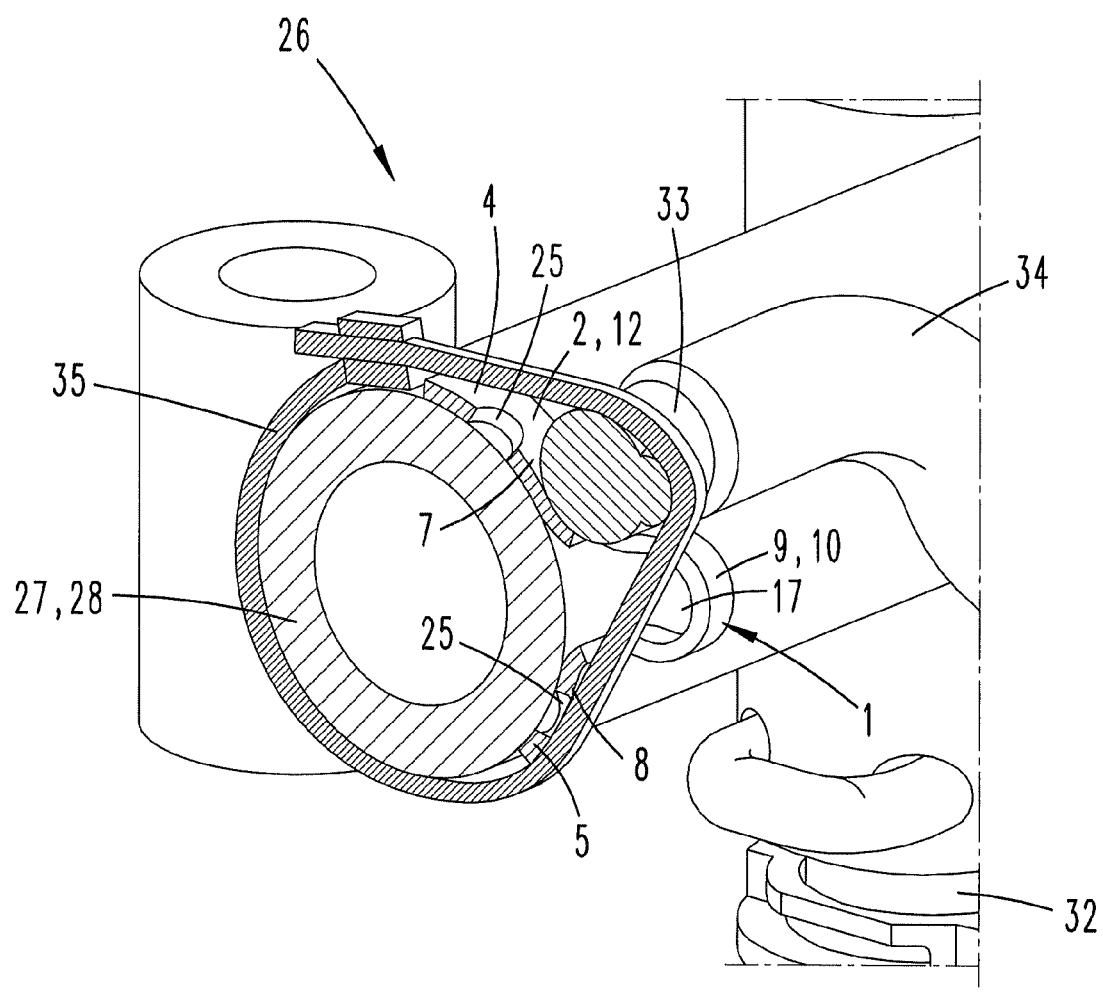

The teachings of the present disclosure describe improved fixing brackets, in particular for fixing a tie wrap at a fuel rail for mounting a wiring harness at the fuel rail. In some embodiments, an improved fixing bracket has a double functionality in that it enables or even guarantees a correct intended position of a tie wrap used for tying the wiring harness with a fuel rail and in that it provides a resting plane for the wiring harness, in particular for an outer wiring harness cable, at the fuel rail. In particular, by the improved fixing bracket it is intended to provide in a serial production an error-proof aid to properly locate a tie wrap, for avoiding assembly errors and for increasing the productivity by shortening the lead time.

In some embodiments, the fixing bracket comprises a one-piece bracket body which extends along a longitudinal extending direction, that the bracket body comprises a first longitudinal end section, a second longitudinal end section and an intermediate section, wherein the intermediate section with regard to the longitudinal extending direction is formed between said first and second longitudinal end sections, that the intermediate section comprises a protrusion wherein the protrusion comprises at least two bows which are spaced apart from each other by a slot which is formed between them. In some embodiments, there is a single component having a combined function of supporting a wiring harness cable on its longitudinal side and of a slot for tying a tie cable on its transversal section.

The fixing bracket can easily be attached to another component, for example to a main gallery of a fuel rail, for example by welding, bracing, screwing or by other means which are known for itself by a skilled person. The slot of the fixing bracket may serve as a means for positioning a tie wrap which may be used for fixing a wiring harness to the fuel rail. The protrusion and/or its neighboring region or regions of the fixing bracket may be used for supporting a wiring harness to be mounted at the fuel rail. Hence, a fixing bracket incorporating the teachings herein has a double functionality: it enables or even guarantees a correct intended position of a tie wrap used for tying a wiring harness on a fuel rail and it may provide a resting plane for a wiring harness on the fuel rail. Accordingly, in particular in a serial production, the fixing bracket provides an error-proof aid for properly locating a tie wrap, for avoiding assembly errors and for increasing productivity by shortening the lead time.

In some embodiments, the first longitudinal end section comprises a portion which is adjacent to the intermediate section, that the second longitudinal end section comprises a portion which is adjacent to the intermediate section, that the protrusion extends along a direction which is transversal or orthogonal with regard to a surface of said portion of the first longitudinal end section and/or which is transversal or orthogonal with regard to a surface of said portion of the second longitudinal end section, and that the bows are spaced apart from each other in a direction which is perpendicular with regard to the longitudinal extending direction.

The mentioned direction along which the protrusion extends may be understood to extend besides to the mentioned surfaces without crossing the surfaces. In some embodiments, the bracket body is integrally made, in particular integrally made of a sheet of metal, plastic or the like, in particular by cutting the sheet before bending or folding it. Hence, a fixing bracket according to the invention may be manufactured in an easy and cheap manner. The bracket body may be a sheet having an elongated rectangular or substantially rectangular (for example, the corners may be rounded) shape. Before its deforming, in particular by bending, the sheet may for example be flat.

In some embodiments, the first longitudinal end section at least in a part of its longitudinal extension is curved to adapt to a first circular contour and/or that the second longitudinal end section at least in a part of its longitudinal extension is curved to adapt to a second circular contour, wherein in particular the first circular contour and the second circular contour are the same and in particular overlap each other. The first and second circular contours may be adapted to the outer contour of a component of a fuel rail in order to enhance an attachment of the fixing bracket to a respective component. In some embodiments, the first longitudinal end section at least in a part of its longitudinal extension is straight and/or that the second longitudinal end section at least in a part of its longitudinal extension is straight.

In some embodiments, the protrusion comprises three or more bows which are spaced apart from each other in a direction which is perpendicular with regard to the longitudinal extending direction, wherein with regard to each pair of neighboring bows both bows of the respective pair adjoin a respective slot between them. This enables to fix two or more tie wraps at a fixing bracket. In some embodiments, with regard to a view of the bracket body being projected to a first geometrical projection plane the bows have a same shape and overlap each other.

In some embodiments, with regard to a view of the bracket body being projected to a first geometrical projection plane the shape of the bows at least in a section of their length is adapted to a third circular contour having a radius smaller compared to a radius of the first circular contour and compared to a radius of the second circular contour, or that with regard to a view of the bracket body being projected to a first geometrical projection plane the shape of the bows at least in a section of their length is adapted to a polygon. Of course, the shape of the bows is not limited to the before described examples. Further, it is possible that with regard to a view of the bracket body being projected to a first geometrical projection plane the shape of the bows at least in a section of their length is symmetrical or asymmetrical with regard to a geometrical center plane. These possibilities enhance a geometrical adaption of the fixing bracket depending on the respective individual requirements.

In some embodiments, the intermediate section has a first portion being adjacent to the first longitudinal end section and has a second portion being adjacent to the second longitudinal end section and that said first portion and/or said second portion forms a respective resting plane, wherein with regard to a view of the bracket body being projected to a first geometrical projection plane each resting plane or a section of each resting plane in particular has a concave shape. By means of one or more resting planes, which in particular may have a concave shape, an intended support of a wiring harness may be improved. The term first geometrical projection plane as used above several times may respectively refer to the same geometrical plane which is considered to be a first reference plane.

In some embodiments, with regard to a view of the bracket body being projected to a second geometrical projection plane the bows extend straight and parallel to each other, wherein in particular the second geometrical projection plane extends perpendicular with regard to the first geometrical projection plane. These features contribute to a simple and cheap production of an inventive fixing bracket. There is the possibility that the first longitudinal end section comprises a via hole and/or that the second longitudinal end section comprises a via hole. By means of these features a fixation of a fixing bracket at another component, e.g. at a main gallery of a fuel rail, may be enhanced. For example, a via hole may be used for an exact positioning of a welding point or the like.

In some embodiments, there is a combination comprising a tubular component, which in particular is a main gallery, of a fuel rail, and one or more fixing brackets, wherein at least one of the fixing brackets comprises one or more of the above described features of a fixing bracket. Regarding technical effects and possible advantages reference is made to the above description. In some embodiments, the main gallery has an outer circular shape and that the radius of said outer circular shape and the radius of the first circular contour and/or the radius of the second circular contour correspond to each other, wherein the combination may also comprise at least one tie wrap and a wiring harness. The tie wrap for example may be a conventional cable tie.

In some embodiments, there is an arrangement as defined above, wherein the fixing bracket is attached, in particular by welding or brazing, to the tubular component of the fuel rail so that the slot extends along a part of the outer circumference of said tubular component, that the wiring harness is supported by the resting plane of the fixing bracket or by one of the resting planes of the fixing bracket and that the tie wrap is wrapped around the tubular component of the fuel rail and around the wiring harness and is fed through the slot of the fixing bracket. Regarding technical effects and possible advantages reference is made to the above description.

In some embodiments, there is a method of manufacturing for a fixing bracket as described above, wherein the method comprises the following steps: providing a lamellar or strip-like sheet of metal or plastic, forming a via hole in a medium region of the sheet by cutting and thereafter bending or folding the sheet so that the protrusion and in particular at least one concave resting plane is formed. The slot for placing and tying the tie cable can be realized by cutting a simple metal sheet before bending or folding it. A proper bending of a cut metal sheet will then create also a resting plane for a wiring harness, maintaining the slot for locating and tying the tie cable.

In some embodiments, there is a method of manufacturing for an arrangement as defined above, wherein the method comprises the following steps: providing a fixing bracket as described herein, attaching the fixing bracket, in particular by welding or brazing, to the tubular component of the fuel rail so that the slot of the fixing bracket extends along a part of the outer circumference of said tubular component, supporting the wiring harness by the resting plane of the fixing bracket or by one the resting planes of the fixing bracket and wrapping the tie wrap around the tubular component of the fuel rail and around the wiring harness by feeding the tie wrap through the slot of the fixing bracket. Regarding technical effects and possible advantages reference is made to the above description.

FIGS. 1-3 depict a first example embodiment of a fixing bracket 1 incorporating the teachings herein. As explained thereafter with reference to FIGS. 4-8, the fixing bracket 1 may be mounted at a fuel rail 29 for fixing a tie wrap 35 at the fuel rail 29 for mounting a wiring harness 33 at the fuel rail 29. The fixing bracket 1 shown by FIGS. 1-3 consists of a one-piece bracket body 2 which extends along a longitudinal extending direction 3. As indicated by the arrows the longitudinal extending direction 3 is adapted to the shape of the bracket body 2 as shown by FIG. 3.

The bracket body 2 comprises a first longitudinal end section 4, a second longitudinal end section 5 and an intermediate section 6 which is formed between the first and second longitudinal end sections 4, 5. The first longitudinal end section 4 comprises a portion 7 which is adjacent to the intermediate section 6, and the second longitudinal end section 5 comprises a portion 8 which is adjacent to an opposite side of the intermediate section 6. The intermediate section 6 comprises a protrusion 9. In the example the protrusion 9 extends transversely with regard to the portions 7, 8. In the example, the protrusion 9 has two bows which are both uniformly denoted by a respective reference number 10. The bows 10 are spaced apart from each other in a direction 11 which is perpendicular with regard to a plane of the longitudinal extending direction 3. Both bows 10 adjoin a slot 17 which is formed between the bows 10.

In some embodiments, the bracket body 2 is integrally made of a sheet 12 of metal by cutting the sheet 12 to a strip-like or lamellar geometry before bending it. In the example, i.e. not necessarily, the first longitudinal end section 4 has a part 13 of its longitudinal extension which is curved in order to adapt to a first circular contour 14. The circular contour 14 is a geometrical reference line and a section of this reference line is shown in FIG. 3 by a broken line. In the example, the second longitudinal end section 5 has a part 15 of its longitudinal extension which is curved to adapt to a second circular contour 16. A section of the second circular contour 16 is shown in FIG. 3 by a broken line, too. From FIG. 3 it appears that in the example the first and second circular contours 14, 16 are the same and overlap each other. Hence, parts 13, 15 are curved to adapt to one and the same circle. In some embodiments, the diameter of such circle may be adapted to an outer diameter of a main gallery 28 of a fuel rail 29 in order to enhance fixation of the fixing bracket 1 at the outer surface of the fuel rail 29 in a particular orientation, please see for example FIG. 4.

In the example, if the bracket body 2 is projected along a direction 18 (indicated in FIG. 2 by an arrow) to a first geometrical projection plane which is parallel to the drawing plane of FIG. 3, both bows 10 have the same contour. The mentioned first geometrical projection plane is an imaginary plane for reference purpose and is also parallel to a plane which is defined by the longitudinal extending direction 3. As it is also shown by FIG. 3, the shape of each bow 10 at least in a medium section of its length is curved to be adapted to a third circular contour 19. From FIG. 3 it is clear that in the example the radius of the third circular contour 19 is much smaller compared to the radius of the first and second circular contours 14, 16, respectively. The diameter of the third circular contour may be adapted to an outer diameter of a wiring harness (not shown by FIGS. 1-3) which may be mounted at for example a main gallery of a fuel rail. As shown in the first example embodiment and with regard to a view of the bracket body 2 when being projected to the before mentioned first geometrical projection plane the shape of both bows 10 is completely symmetrical with regard to a geometrical (i.e. imaginary) center plane 20.

Further, in the example the intermediate section 6 has a first portion 21 which is adjacent to the first longitudinal end section and a second portion 22 which is adjacent to the second longitudinal end section 5. At an outside, i.e. at the side which faces away from the first and second circular contours 14, 16, the first portion 21 provides a resting plane 23 adjacent to the bows 10 and the second portion 22 correspondingly provides a resting plane 24 also adjacent to the bows 10. A curvature of the resting planes 23, 24 may be adapted to the outer diameter of a wiring harness 33 which has to be fixed by the fixing bracket 1 for example at an outer surface of a main gallery 28 of a fuel rail 29 (please see for example FIGS. 4-8).

With regard to a view of the bracket body 2 when being projected to a second geometrical projection plane which is considered to be parallel to the drawing plane of FIG. 2 the bows 10 extend straight and parallel to each other. At the first longitudinal end section 4 and at the second longitudinal end section 5 it is formed a via hole 25, respectively, wherein both via holes are denoted by the same reference number 25. The via holes 25 may serve to enhance a fixation of the fixing bracket 1 at another component, for example at a fuel rail 29, for example by welding, bracing, screwing or by any other appropriate manner. Further, in the example the slot 17 has been formed by cutting a rectangular via hole in the sheet 12 and thereafter by bending the sheet 12 to the explained contour.

FIG. 4 depicts a first example embodiment of an arrangement 26 incorporating teachings of the present disclosure. The arrangement comprises elements of a first example embodiment of a combination incorporating teachings of the present disclosure. The combination comprises a tubular component 27, which in the example is a main gallery 28 of a fuel rail 29 and a number of fixing brackets 1 as previously described with regard to FIGS. 1-3. In the arrangement 26 as depicted by FIG. 4, the fixing brackets 1 are attached by means of welding (the weld seams are not shown in the FIGS. 4-8) to an outer surface of the main gallery 28 so that the slot 17 of the fixing brackets 1 extend along a part of a respective outer circumference of the main gallery 28.

FIG. 5 depicts a second example embodiment of an arrangement 26 incorporating teachings of the present disclosure. In this arrangement 26 the combination of elements depicted by FIG. 4 have been added by additional elements. For example, fuel injectors are denoted by a reference number 32, respectively, and electronic devices for the fuel injectors 32 are denoted by reference number 31, respectively. A wiring harness 33 comprises an outer wiring harness cable 34. The main gallery 28 has an outer circular shape and the radius of said shape corresponds to the radii of the first and second circular contours 14, 16 as shown by FIG. 3.

Furthermore, the combination and arrangement 26 as shown by FIG. 5 comprises a number of tie wraps 35. The wiring harness 33 is supported by a respective resting plane 23 of each of the fixing brackets 1. A respective tie wrap 35 is wrapped around the tubular component 27 of the fuel rail 29 and around the wiring harness 33 (or at least around a partial strand of the wiring harness 33), is fed through the slot 17 of the fixing bracket 1 and is closed in a manner which itself is known by a person skilled in the art. Accordingly, the wiring harness 33 is attached to the fuel rail 29 at an intended predetermined position by using fixing brackets 1 as described herein. On providing the arrangement 26 the wiring harness 33 is supported by the resting planes 23 of the fixing brackets 1 and thereafter the tie wraps 35 have been wrapped around the tubular component 27 and around the wiring harness 33 by feeding the tie wraps 35 through the respective slot 17 of the fixing bracket 1. Hence, the tie wraps 35 are fixed at intended positions by the slots 17 of the fixing brackets 1.

FIGS. 9-11 depict a second example embodiment of a fixing bracket 1 incorporating the teachings herein. Differing from the first described embodiment, the fixing bracket 1 comprises three bows 10 which are spaced apart from each other in a direction 11 which is perpendicular with regard to the longitudinal extending direction 3. With regard to each pair of neighboring bows 10 both of the respective bows 10 adjoin a respective slot 17 which is formed between them.

FIGS. 12-14 depict a third example embodiment of a fixing bracket incorporating the teachings herein. Differing from the first described embodiment the shape of the bows 10 is asymmetrical with regard to a geometrical center plane 20. Like in the first and second example embodiments, a direction X along which the protrusion 9 extends may be parallel to the geometrical center plane 20.

FIGS. 15-17 depict a fourth example embodiment of a fixing bracket 1 incorporating the teachings herein wherein the shape of the bows is also asymmetrical with regard to a geometrical center plane 20.

Figure 18:
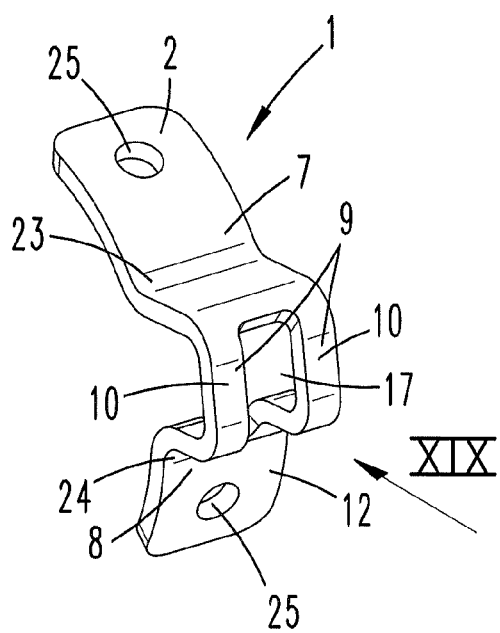
Figure 19:
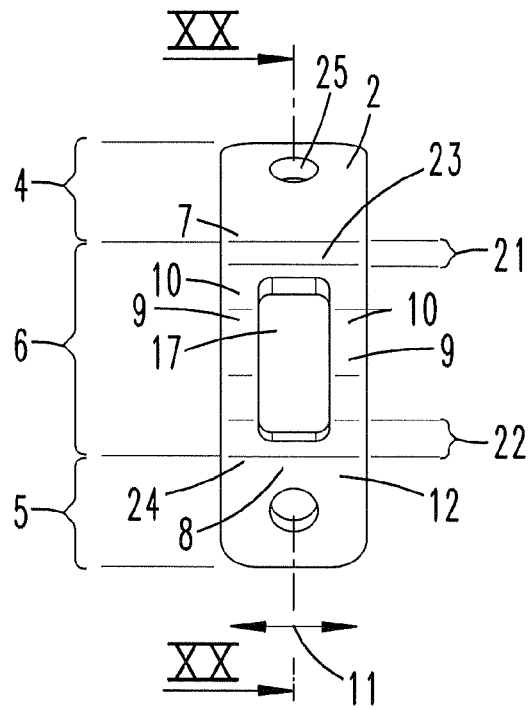
Figure 20:
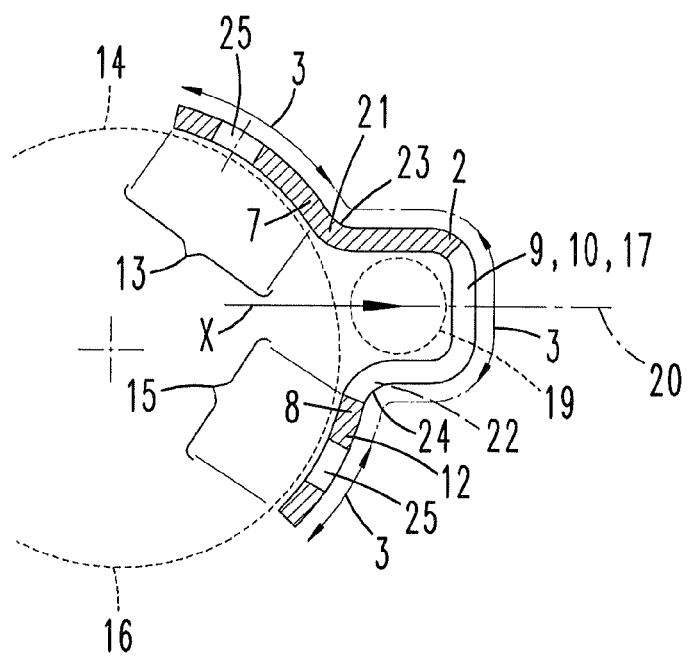

FIGS. 18-20 depict a fifth example embodiment of a fixing bracket 1 incorporating the teachings herein. With regard to a view of the bracket body 2 being projected to the above-explained first geometrical projection plane the shape of the bows 10 in a respective section of their lengths is adapted to a polygon.

All disclosed features are (for its own, but also in combination) relevant for the teachings herein. The features of the various embodiments characterize independent features of the teachings herein, and do not represent limitations on the applications thereof.

What is claimed is:

1. A fixing bracket for fixing a tie wrap at a fuel rail for mounting a wiring harness at the fuel rail, the fixing bracket comprising:
    a one-piece bracket body formed from a lamellar or strip-like sheet of metal or plastic extending along a longitudinal axis, the bracket body including a first longitudinal end section, a second longitudinal end section, and an intermediate section;
    wherein the intermediate section is disposed between the first end section and the second end section and formed by bending or folding the sheet to form a protrusion including two bows spaced apart from one other by a slot disposed between the bows, the slot formed via a hole cut in the sheet; and
    the first longitudinal end section and the second longitudinal end section each extend away from the intermediate section and respectively form a contour matching an outer surface of the fuel rail, the contour resulting from the bending or folding the sheet.

2. A fixing bracket according to claim 1, wherein:
    the first longitudinal end section comprises a respective first portion adjacent to the intermediate section;
    the second longitudinal end section comprises a respective first portion adjacent to the intermediate section;
    the protrusion extends along a direction transverse or orthogonal with regard to a surface of the portion of the first longitudinal end section and/or with regard to a surface of the portion of the second longitudinal end section; and
    the bows are spaced apart from each other in a direction perpendicular with regard to the longitudinal axis.

3. A fixing bracket according to claim 1, wherein the bracket body is integrally made by cutting a sheet into a lamellar or strip-like form before bending and/or folding it.

4. A fixing bracket according to claim 1, wherein the protrusion comprises three bows spaced apart from each other in a direction perpendicular to the longitudinal axis; and
    the fixing bracket comprises two slots, each slot disposed between two of the three bows.

5. A fixing bracket according to claim 1, wherein, with regard to a view of the bracket body projected to a first geometrical projection plane, at least a section of each bow is adapted to a circular contour or a polygon.

6. A fixing bracket according to claim 1, wherein the intermediate section includes a first portion adjacent the first longitudinal end section and a second portion adjacent to the second longitudinal end section; and
    said first portion and/or said second portion forms a respective resting plane;
    wherein, with regard to a view of the bracket body projected to a geometrical projection plane, at least a section of the resting plane has a concave shape.

7. A fixing bracket according to claim 1, wherein, with regard to a view of the bracket body projected to a geometrical projection plane, the bows extend straight and parallel to each other.

8. A fixing bracket according to claim 1, wherein at least one of the first longitudinal end section and the second longitudinal end section comprises a via hole.

9. A system comprising:
    a main gallery of a fuel rail;
    a tie wrap; and
    a wiring harness;
    wherein the main gallery has an outer circular shape with a radius;
    a fixing bracket for fixing a tie wrap at the fuel rail for mounting a wiring harness at the fuel rail, the fixing bracket comprising a one-piece bracket body extending along a longitudinal axis, the bracket body including a first longitudinal end section, a second longitudinal end section, and an intermediate section;
    wherein the intermediate section is disposed between the first end section and the second end section;
    the intermediate section comprises a protrusion including two bows spaced apart from one other by a slot disposed between the bows;
    the first longitudinal end section and the second longitudinal end section each extend away from the intermediate section and respectively form a contour matching an outer surface of the fuel rail;
    the fixing bracket is attached to the main gallery of the fuel rail and the slot extends along a part of the outer circumference of the main gallery;
    the wiring harness is supported by a resting plane of the fixing bracket;
    the tie wrap is wrapped around the main gallery; and
    the wiring harness is fed through the slot of the fixing bracket.

10. A method of manufacturing a fixing bracket, the method comprising:
    providing a lamellar or strip-like sheet of metal or plastic;
    forming a via hole in a region of the sheet by cutting; and
    thereafter, bending or folding the sheet to form a protrusion and a concave resting plane are formed;
    wherein the protrusion comprises an intermediate section disposed between a first longitudinal end section and a second longitudinal end section; and
    the concave resting plane includes the first longitudinal end section and the second longitudinal end section, each end section extending away from the intermediate section to form a contour matching an outer surface of a fuel rail.

* * * * *